(12) United States Patent
Fullerton

(10) Patent No.: US 7,886,866 B2
(45) Date of Patent: Feb. 15, 2011

(54) SYSTEM AND METHOD FOR IGNITION OF A GASEOUS OR DISPERSED FUEL-OXIDANT MIXTURE

(75) Inventor: Larry W. Fullerton, New Hope, AL (US)

(73) Assignee: Soundblast Technologies, LLC, Winter Park, FL (US)

( * ) Notice: Subject to any disclaimer, the term of this patent is extended or adjusted under 35 U.S.C. 154(b) by 557 days.

(21) Appl. No.: 11/785,321

(22) Filed: Apr. 17, 2007

(65) Prior Publication Data

US 2011/0005420 A1    Jan. 13, 2011

Related U.S. Application Data

(60) Provisional application No. 60/792,420, filed on Apr. 17, 2006, provisional application No. 60/850,685, filed on Oct. 10, 2006.

(51) Int. Cl.
    *G01V 1/06* (2006.01)
(52) U.S. Cl. .............. 181/117; 181/118; 89/7; 102/355; 102/363; 102/403
(58) Field of Classification Search ........... 181/117, 181/118; 89/7; 102/355, 363, 403
    See application file for complete search history.

(56) References Cited

U.S. PATENT DOCUMENTS

| | | | |
|---|---|---|---|
| 2,994,397 A | | 8/1961 | Huckabay et al. |
| 3,064,753 A | | 11/1962 | McClure |
| 3,099,813 A | * | 7/1963 | Anderson ............ 367/145 |
| 3,233,694 A | | 2/1966 | Roever |
| 3,235,026 A | | 2/1966 | Hottman |
| 3,410,142 A | | 11/1968 | Diaber et al. |
| 3,828,886 A | * | 8/1974 | Holloway ............ 181/118 |
| 4,043,420 A | | 8/1977 | Zens et al. |
| 4,356,753 A | | 11/1982 | Galley |
| 4,642,611 A | * | 2/1987 | Koerner ............ 340/385.1 |

(Continued)

FOREIGN PATENT DOCUMENTS

GB          934 749          8/1963

(Continued)

OTHER PUBLICATIONS

International Search Report dated Apr. 24, 2008 Issued in International Application No. PCT/US2007/09441.

(Continued)

*Primary Examiner*—J. Woodrow Eldred
(74) *Attorney, Agent, or Firm*—Venable LLP; Robert S. Babayi

(57) ABSTRACT

An improved system and method for ignition of a gaseous or dispersive fuel-oxidant mixture is provided where a gaseous or dispersive fuel-oxidant mixture is supplied to a detonator tube having a fill point and an open end and an igniter placed at an ignition point within the detonator tube is ignited while the gaseous or dispersive fuel-oxidant mixture is flowing through the detonator tube. A detonation impulse is produced at the ignition point that propagates to the open end of said detonator tube where it can be supplied to a detonation tube having an open end, to an internal combustion engine, a combustion chamber, and to a pulse detonation engine.

20 Claims, 13 Drawing Sheets

U.S. PATENT DOCUMENTS

| | | |
|---|---|---|
| 4,662,844 A | 5/1987 | Gallagher et al. |
| 4,664,631 A | 5/1987 | Pederson et al. |
| 4,741,154 A | 5/1988 | Eidelman |
| 5,345,758 A | 9/1994 | Bussing |
| 5,430,691 A | 7/1995 | Fridman |
| 5,473,885 A | 12/1995 | Hunter, Jr. et al. |
| 5,513,489 A | 5/1996 | Bussing |
| 5,579,633 A | 12/1996 | Hunter, Jr. et al. |
| 5,644,314 A | 7/1997 | Ahmad et al. |
| 5,800,153 A | 9/1998 | DeRoche |
| 5,855,827 A | 1/1999 | Bussing et al. |
| 5,864,517 A * | 1/1999 | Hinkey et al. ............ 367/145 |
| 5,873,240 A | 2/1999 | Bussing et al. |
| 5,937,635 A | 8/1999 | Winfree et al. |
| 5,973,999 A | 10/1999 | Naff et al. |
| 6,003,301 A | 12/1999 | Bratkovich et al. |
| 6,062,018 A | 5/2000 | Bussing |
| 6,360,173 B1 | 3/2002 | Fullerton |
| 6,408,614 B1 | 6/2002 | Eizenhofer |
| 6,813,878 B2 | 11/2004 | Kraft |
| 6,928,804 B2 | 8/2005 | Venkataramani et al. |
| 7,007,455 B2 | 3/2006 | Kraft |
| 7,093,794 B2 | 8/2006 | Leyva et al. |
| 7,100,377 B2 | 9/2006 | Kraft |
| 2005/0125933 A1 | 6/2005 | Hochstein, Jr. et al. |

FOREIGN PATENT DOCUMENTS

| | | |
|---|---|---|
| GB | 1 269 123 | 4/1972 |

OTHER PUBLICATIONS

Written Opinion of the International Searching Authority dated Apr. 24, 2008, Issued in International Application No. PCT/US2007/09441.

Nicholls, J.A. et al., "Intermittent detonation as a thrust-producing mechanism," Engineering Research Institute, University of Michigan, Jan. 1954.

Van Wingerden, K. et al., "Detonations in pipes and in the open," Christian Michelsen Research, Bergen, Norway, Nov. 1999.

Kelly, J., "After Combustion: Detonation," Popular Science, Sep. 2003.

Lu, F.K. et al., "Experimental study of a pulse detonation rocket with Shchelkin spiral," Aerodynamics Research Center, University of Texas at Arlington, TX 76019, USA, pp. 1-6.

Notification of Transmittal of the International Search Report and the Written Opinion of the International Searching Authority, Or The Declaration dated Sep. 10, 2008.

International Search Report dated Sep. 10, 2008 issued in PCT/US07/09442.

Written Opinion of the International Searching Authority dated Sep. 10, 2008 issued in PCT/US07/09442.

Office Action of Mar. 29, 2010 issued in a related case U.S. Appl. No. 11/785,320.

* cited by examiner

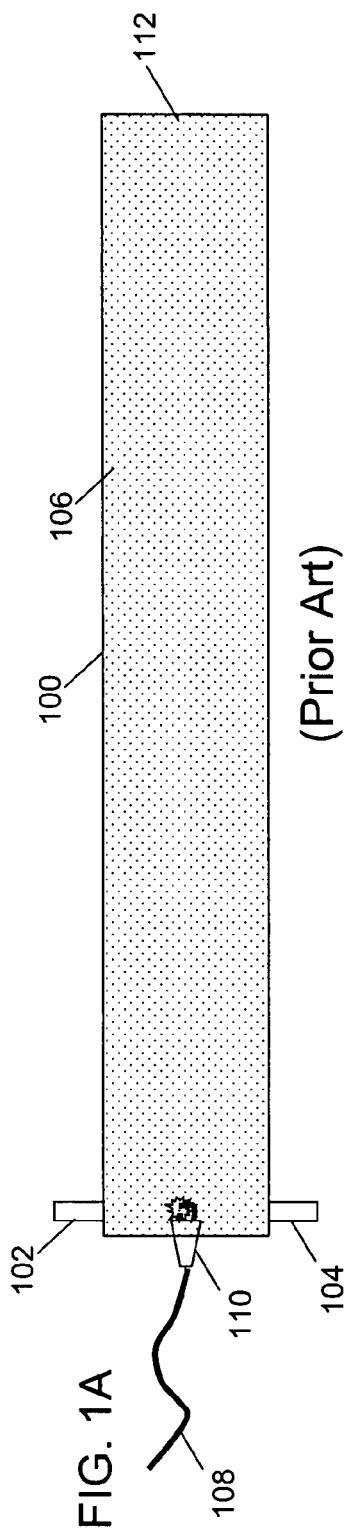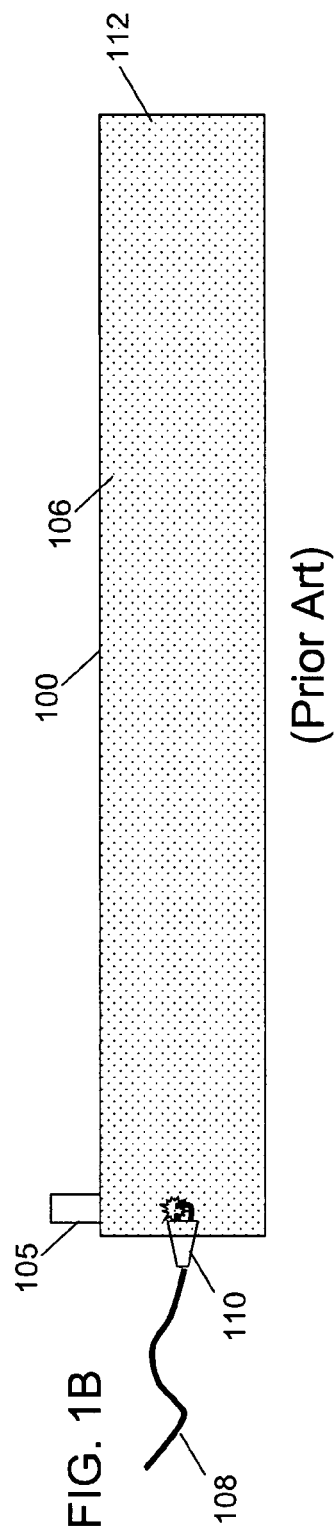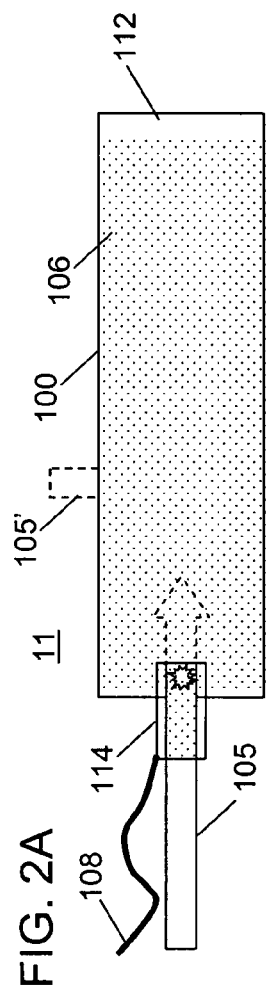

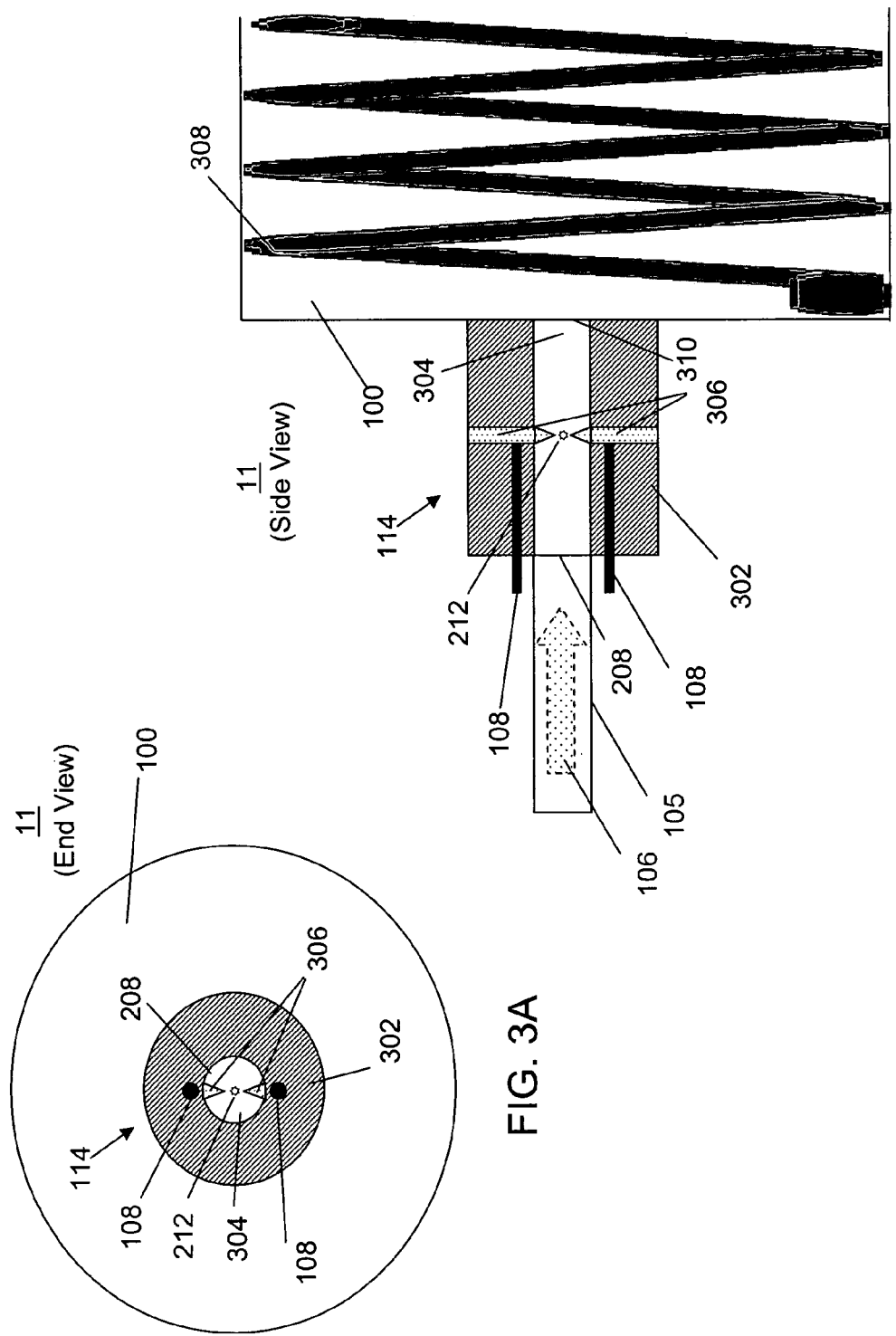

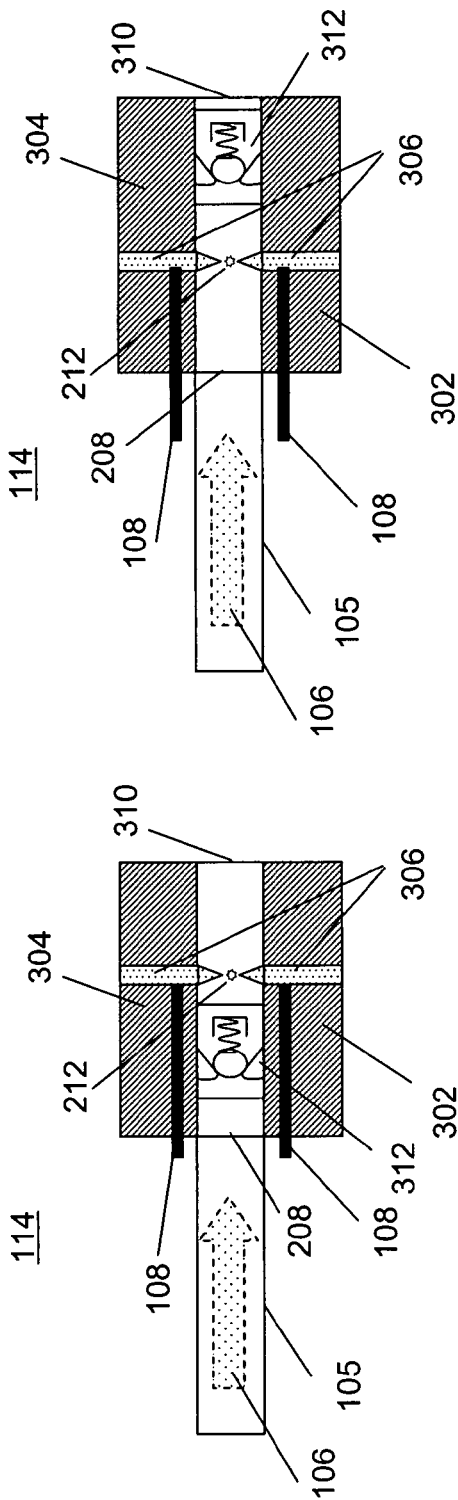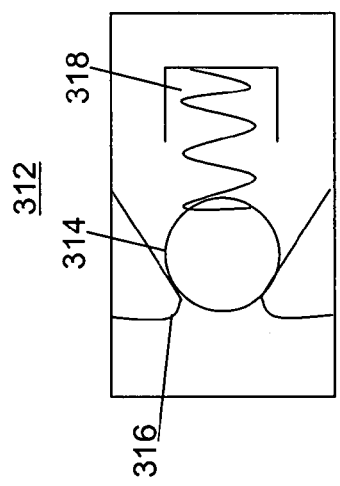
FIG. 3D
FIG. 3C
FIG. 3E

702

704

706

710

708

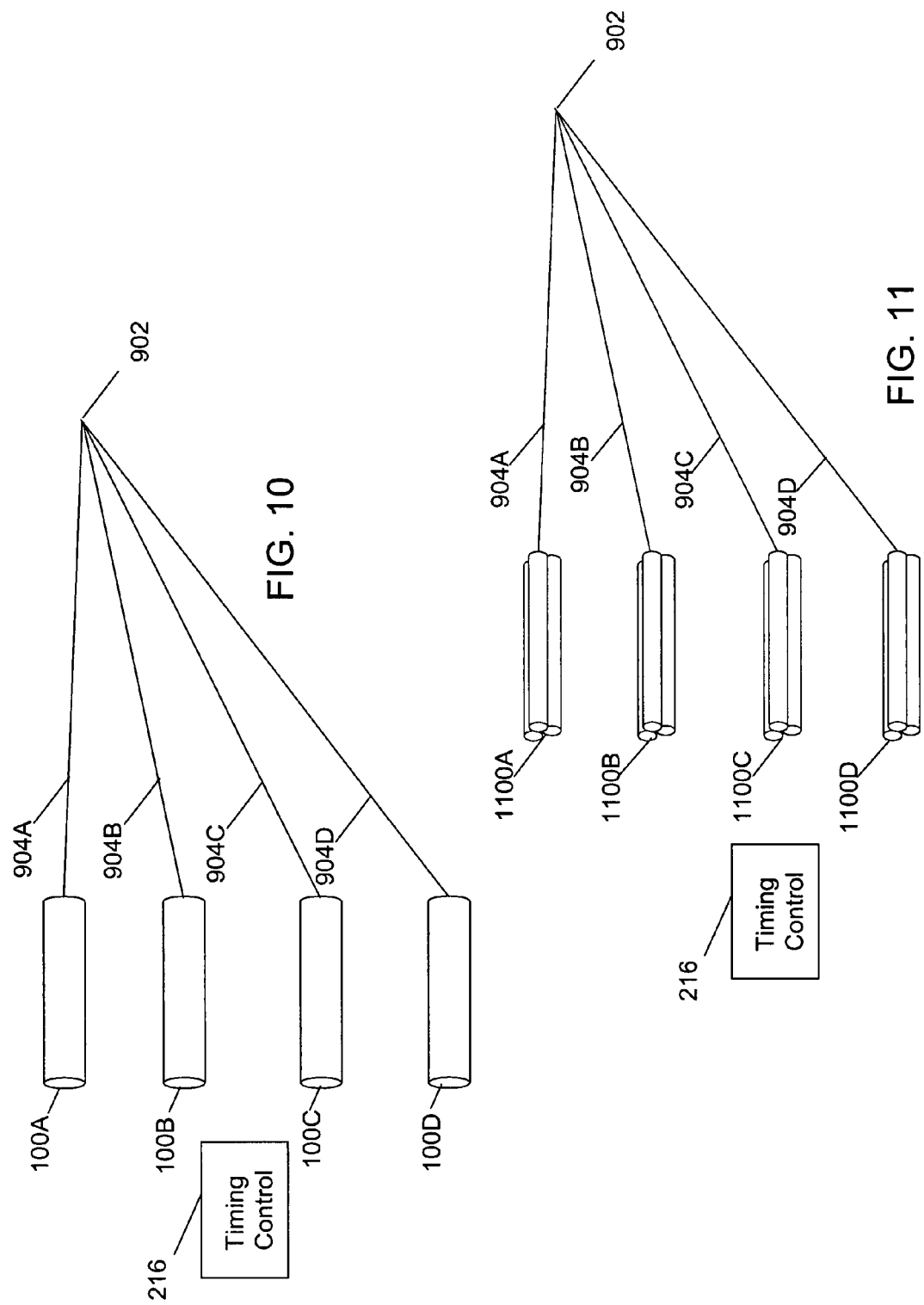

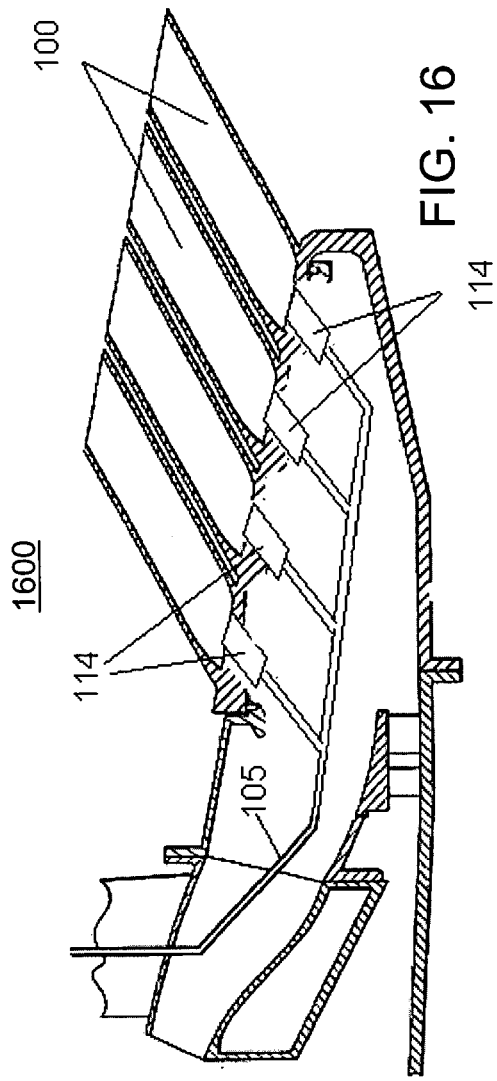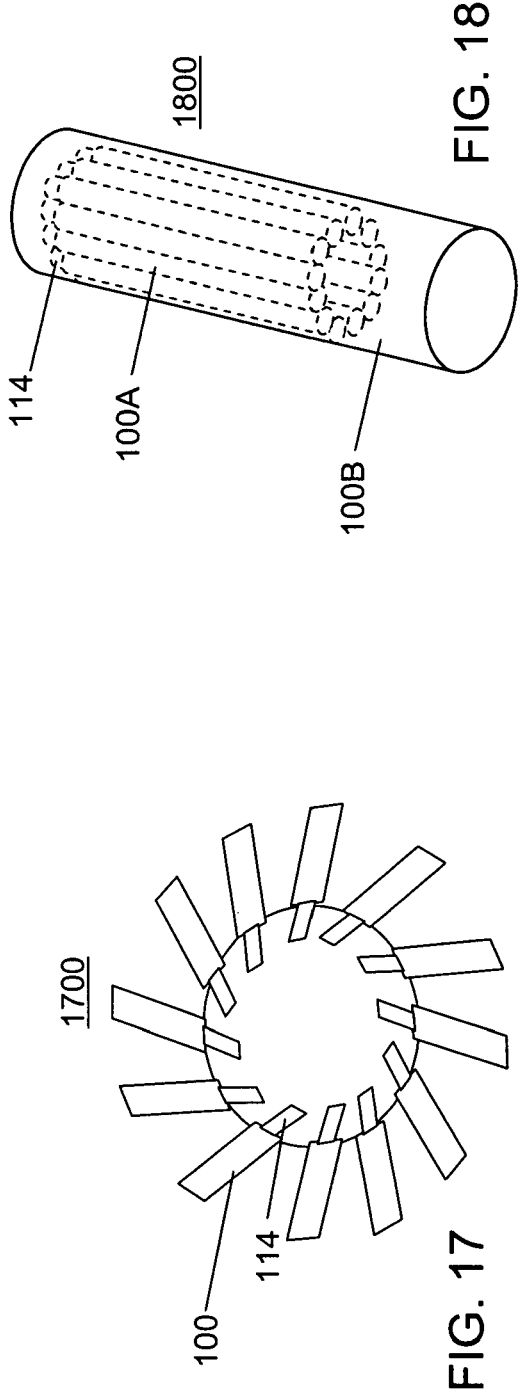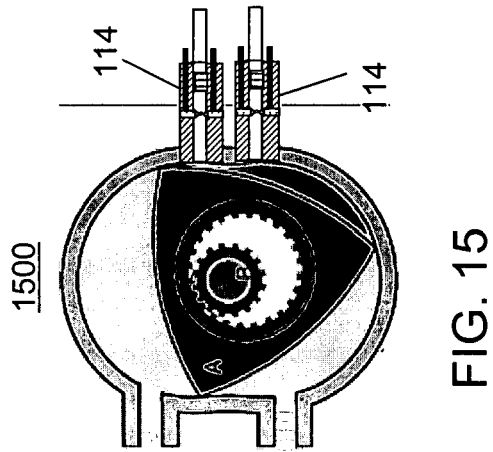

SYSTEM AND METHOD FOR IGNITION OF A GASEOUS OR DISPERSED FUEL-OXIDANT MIXTURE

CROSS REFERENCE TO RELATED APPLICATIONS

This application claims priority to U.S. Provisional Patent Application 60/792,420, filed Apr. 17, 2006, and to U.S. Provisional Patent Application 60/850,685, filed Oct. 10, 2006, which are both incorporated herein by reference. This application is also related to a U.S. Provisional Patent Application filed concurrently on Oct. 10, 2006, titled "A System and Method for Generating and Directing Very Loud Sounds".

FIELD OF THE INVENTION

The present invention relates generally to a system and method for ignition of a gaseous or dispersive fuel-oxidant mixture. More particularly, the present invention relates to controlling the detonation of a gaseous or dispersive fuel-oxidant mixture flowing within a tubular structure.

BACKGROUND OF THE INVENTION

Existing systems and methods for ignition of a gaseous or dispersive fuel-oxidant mixture are inefficient, costly, and often dangerous. Modern spark plug-based ignition technology used in internal combustion engines leaves unspent fuel in the cylinders of such engines after the combustion cycle and requires use of a catalytic converter to convert toxic combustion byproducts to safer byproducts but which still result in dangerous pollutants being emitted into the atmosphere. Moreover, spark plugs degrade in performance over time resulting in lower and lower combustion efficiency and therefore lower and lower fuel mileage and greater and greater pollution. It is therefore desirable to have an improved system and method for ignition of a fuel-oxidant mixture in internal combustion engines.

Pulse detonation engine technology, which is being developed primarily for use in airplane and rocket engines, promises to provide much higher performance than internal combustion engines. However, the fuel-oxidant mixture ignition methods that have been used in such pulse detonation engines require the use of dangerous and costly fuel-oxidant mixtures and a significant amount of energy to achieve detonation. Moreover, the timing and the magnitudes of the detonations produced in such engines are difficult to control due to the limitations of the ignition methods being deployed. As such, it is also desirable to have an improved system and method for ignition of a fuel-oxidant mixture in pulse detonation engines.

SUMMARY OF THE INVENTION

Briefly, the present invention is an improved system and method for ignition of a gaseous or dispersive fuel-oxidant mixture. A fuel-oxidant mixture having desired combustion characteristics is introduced at a desired flow rate into a tubular structure. In one exemplary embodiment, the tubular structure comprises a detonator having a specified length and diameter. The flowing fuel-oxidant mixture is ignited within the detonator by introducing a spark at an ignition point within the flowing fuel-oxidant mixture. A resulting detonation impulse continues to ignite the flowing fuel-oxidant mixture from the ignition point to the exit end of the detonator. The combustion characteristics and the flow rate of the fuel-oxidant mixture can be selected to control the energy of the detonation impulse.

The present invention provides a method for igniting a gaseous or dispersive fuel-oxidant mixture, comprising the steps of placing an igniter at an ignition point within a detonator tube of a detonator having a fill point and an open end, supplying a gaseous or dispersive fuel-oxidant mixture to the fill point that exits out the open end, and igniting the flowing gaseous or dispersive fuel-oxidant mixture using the igniter to produce a detonation impulse that propagates from the ignition point to the open end of the detonator tube. A valve, such as a check valve, can be placed inside the detonation tube either before the ignition point or after the ignition point. The detonation impulse can be supplied to a detonation tube, an internal combustion engine, or a pulse detonation engine. The mass ratio of fuel versus oxidant and a flow rate of the gaseous or dispersed fuel-oxidant mixture can be selected based on a length and a diameter of the detonator tube. The gaseous or dispersive fuel-oxidant mixture can be ethane, methane, propane, hydrogen, butane, alcohol, acetylene, MAPP gas, gasoline, or aviation fuel, or some combination. The fuel may also be any petroleum distillate such as naphtha, mineral oil, kerosene or diesel, or more complex materials such as benzene or DEET. The timing of the igniter can be controlled using a trigger mechanism, fixed logic, or a control processor.

The present invention provides a system for igniting a gaseous or dispersive fuel-oxidant mixture including a detonator and a fuel-oxidant mixture supply subsystem. The detonator includes a detonator tube having a fill point and an open end and an igniter that is placed at an ignition point within the detonator tube. The fuel-oxidant mixture supply subsystem supplies a gaseous or dispersive fuel-oxidant mixture to the fill point of the detonator tube that flows through the detonator tube and exits out its open end. The igniter ignites the gaseous or dispersive fuel-oxidant mixture while the gaseous or dispersive fuel-oxidant mixture is flowing through the detonator tube thereby producing a detonation impulse at the ignition point that propagates to the open end of the detonator tube. The system can include a valve, such as a check valve, that is located inside the detonation tube either before the ignition point or after the ignition point. The system can include a timing control mechanism that controls the timing of the igniter. The timing control mechanism can be a trigger mechanism, fixed logic, or a control processor. The igniter can be a high voltage pulse source, a triggered spark gap source, a laser, or an exploding wire.

The invention also provides a detonator comprising a detonator tube having a fill point and an open end and an igniter placed at an ignition point within said detonator tube. The fill point of the detonation tube is supplied a gaseous or dispersive fuel-oxidant mixture that flows through the detonator tube and exits out its open end. The igniter ignites the gaseous or dispersive fuel-oxidant mixture while the gaseous or dispersive fuel-oxidant mixture is flowing through the detonator tube thereby producing a detonation impulse at the ignition point that propagates to the open end of the detonator tube. The detonator can include a valve, such as a check valve, located inside the detonation tube.

BRIEF DESCRIPTION OF THE DRAWINGS

The present invention is described with reference to the accompanying drawings. In the drawings, like reference numbers indicate identical or functionally similar elements.

Additionally, the left-most digit(s) of a reference number identifies the drawing in which the reference number first appears.

FIG. 1A illustrates an exemplary prior art detonation tube having separate fuel and oxidizer supplies and a spark plug that ignites the fuel-oxidant mixture at the closed end of the tube after the tube has been filled;

FIG. 1B illustrates a second exemplary prior art detonation tube having a fuel-oxidant mixture supply and a spark plug that ignites the fuel-oxidant mixture at the closed end of the tube after the tube has been filled;

FIG. 2A illustrates an exemplary detonation tube of the present invention having a detonator that receives a fuel-oxidant mixture from a fuel-oxidant mixture supply and ignites the fuel-oxidant mixture as it is flowing into the tube;

FIG. 3A depicts an end view of another embodiment of the detonator of the present invention.

FIG. 3B depicts a side view of the detonator of FIG. 3A.

FIG. 3C depicts an exemplary embodiment of the detonator of the invention including a check valve used to control the flow of a supplied fuel-oxidant mixture where the check valve is placed in front of the ignition point in the detonator tube;

FIG. 3D depicts an exemplary embodiment of the detonator of the invention including a check valve used to control the flow of a supplied fuel-oxidant mixture where the check valve is place after of the ignition point in the detonator tube;

FIG. 3E depicts an exemplary check valve that can be used with the exemplary embodiments of the detonator of the present invention shown in FIGS. 3C and 3D;

FIG. 10 depicts a sparse array of 4 detonation tubes being detonated so as to steer the overpressure waves such that they combine at a desired location;

FIG. 11 depicts a sparse array of 4 groups of detonation tubes being detonated so as to steer the overpressure waves such that they combine at a desired location;

FIG. 15 depicts an exemplary Wankel engine using the two detonators of the present invention;

FIG. 16 depicts a cross-section of an aircraft wing having four pulse detonation engines using the detonator of the present invention;

FIG. 17 depicts an exemplary turbine based upon multiple pulse detonation engines using the detonator of the present invention; and FIG. 18 depicts an exemplary arrangement of pulse detonation engines using the detonator of the present invention that might be used to provide thrust for a rocket.

DETAILED DESCRIPTION OF THE INVENTION

Figure 2B:
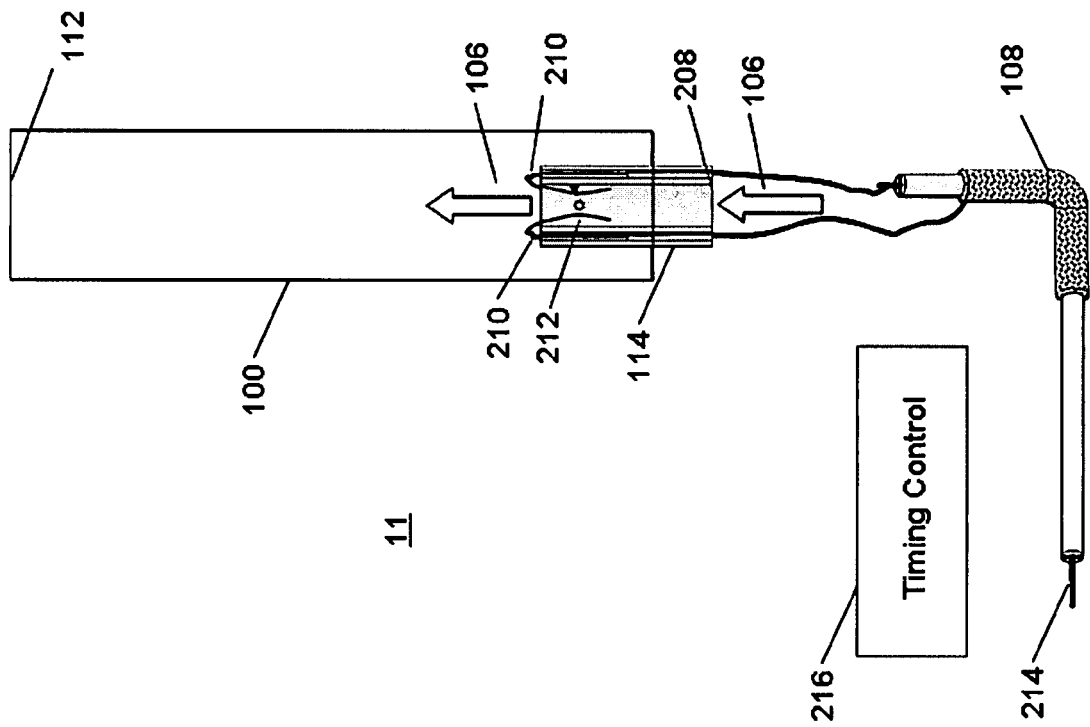
FIG. 2B depicts a first embodiment of the detonator of the present invention that functions by creating an electrical arc within a stream of a gas mixture.

The present invention will now be described more fully in detail with reference to the accompanying drawings, in which the exemplary embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

The present invention provides an improved system and method for generating and controlling an overpressure wave, which is also be referred to herein as a sound wave or sound pulse. Exemplary overpressure waves can be characterized by their frequency in the range of 0.1 Hz to 30 KHz. The basis of the system is the ignition of a high energy, detonable gaseous or dispersed fuel-air or fuel-oxygen mixture within a tube that is open at one end, where any of a number of flammable fuels can be used including ethane, methane, propane, hydrogen, butane, alcohol, acetylene, MAPP gas, gasoline, and aviation fuel. The fuel may also be any petroleum distillate such as naphtha, mineral oil, kerosene or diesel, or more complex materials such as benzene or DEET. The gas mixture is detonated at the closed end of the tube causing a detonation wave to propagate the length of the tube where detonation ends and the detonation wave exits the open end of the tube as an overpressure wave. The tube is referred to herein as a detonation tube and the detonation wave is referred to herein as a detonation pulse or impulse.

One embodiment of the present invention comprises at least one detonation tube apparatus and a timing control mechanism for controlling the timing of detonations. The detonation tube apparatus comprises at least one detonation tube, at least one detonator, and a fuel-oxidant mixture supply subsystem. One or more detonators can be used with a given detonation tube and a detonator can be used with multiple detonation tubes. Associated with the one or more detonators is one or more spark initiators where a single spark initiator may initiate sparks in multiple detonators, which may be in parallel or in series, and multiple spark initiators may initiate sparks in a single detonator. The timing control mechanism controls the timing of the one or more spark initiators.

The spark initiator may be a high voltage pulse source. As an alternative to the high voltage pulse source a triggered spark gap approach can be used as a spark initiator. Other alternatives for a spark initiator include a laser and an exploding wire.

The timing control mechanism can be a simple trigger mechanism, fixed logic, or be a more complex control processor. A control processor may also be used to control variable parameters of the fuel-oxidant mixture supply subsystem or such parameters may be fixed.

The fuel-oxidant mixture supply subsystem maintains a desired mass ratio of fuel versus oxidant of the fuel-oxidant mixture and a desired flow rate of the fuel-oxidant mixture. Desired fuel versus oxidant ratio and flow rate can be selected to achieve desired detonation characteristics that depend on length and diameter characteristics of the detonator. For example, one embodiment uses a propane-air fuel-oxidant mixture, a mass ratio of 5.5 and a flow rate of 50 liters/minute for a detonator having a length of 1" and a ¼" diameter and made of Teflon, a first detonation tube made of stainless steel having a length of 9" and a diameter that tapers from 0.8" at the end connected to the detonator to 0.65" at the end connected to a second detonation tube made of titanium having a length of 32"and a 3" diameter. Alternatively, the first detonation tube may have a constant diameter of 0.8".

Commercially available mass flow control valve technology can be used to control the mass ratio of fuel versus oxidant of the fuel-oxidant mixture and the flow rate of the fuel-oxidant mixture. Alternatively, commercially available technology can be used to measure the mass flow of oxidant into a fuel-oxidant mixture mixing apparatus and the precise oxidant mass flow measurement can be used to control a mass flow control valve to regulate the mass flow of the fuel needed to achieve a desired mass ratio of fuel versus oxidant of the fuel-oxidant mixture.

Detonation within Flowing Fuel-Oxidant Mixture

Prior art gas detonation systems either required long tubes or highly detonable gas mixtures such as oxygen and hydrogen in order to produce a detonation. Otherwise they will only "deflagrate" which is a slow and nearly silent process. In contrast, one aspect of the present invention provides the ability to produce short, high intensity sound pulses within a tube as short as one foot long and 2 inches diameter, using only moderately explosive gas mixtures such as propane and air. Unlike the prior art systems, this aspect of the present invention is embodied in an exemplary system that passes an electric arc through a flowing (or moving) stream of gas and oxidizer mixture that is filling the tube within which the detonation will take place. When the tube is substantially full, a fast spark is initiated within the flowing gas at the filling point in the tube, which triggers the subsequent detonation of all the gas inside the tube. Alternatively, the flowing gas can be detonated by a laser or by any other suitable ignition and detonation method according to the present invention. This ignition within flowing gas technique dramatically shortens the tube length required to produce a detonation when compared to prior art systems that ignited non-flowing or otherwise still gas mixtures. Moreover, detonation according to this aspect of the present invention requires on the order of 1 Joule of energy to detonate the fuel-oxidant mixture whereas prior art systems may require 100's to 1000's of Joules of energy to achieve detonation. Further desirable results of this method are the reduction of uncertainty of time between the electric arc trigger and the subsequent emission of the sound pulse from the tube and the repeatability of detonation pulse magnitude. As such, the detonator according to this aspect of the present invention enables precise timing and magnitude control of an overpressure wave.

FIG. 1A depicts a side view of a prior art detonation system. A detonation tube 100 has separate fuel supply 102 and oxidizer supply 104 which are opened during a fill period to fill detonation tube 100 with fuel-oxidant mixture 106. After the fill period, fuel supply 102 and oxidizer supply 104 are closed and at a desired time a charge is applied through high voltage wire 108 to spark plug 110, which ignites the fuel-oxidant mixture 106 causing a detonation wave to propagate down the length of the detonation tube 100 and exit its open end 112. Similarly, FIG. 1B depicts a side view of another prior art detonation system where detonation tube 100 has a fuel-oxidant mixture supply 105 which is opened during a fill period to fill detonation tube 100 with fuel-oxidant mixture 106. After the fill period, fuel-oxidant mixture supply 105 is closed and at a desired time a charge is applied through high voltage wire 108 to spark plug 110, which ignites the fuel-oxidant mixture 106 causing a detonation wave to propagate down the length of the detonation tube 100 and exit its open end 112.

FIG. 2A depicts the detonation tube 100 of the overpressure wave generator 11 of the present invention being supplied by fuel-oxidant mixture supply 105 via detonator 114, where a spark ignites within the fuel-oxidant mixture 106 while the detonation tube 100 is being filed with the fuel-oxidant mixture 106 causing a detonation wave to propagate down the length of the detonation tube 100 and exit its open end 112. In one embodiment, an appropriate fuel-oxidant mixture flow rate is maintained during ignition within the flowing fuel-oxidant mixture. It has been found that over a substantial range of flows the higher the flow rate the more rapid the evolution of the detonation wave. Hence, one exemplary embodiment uses a high flow rate. For a given spark energy, a certain flow rate defines the practical upper limit of flow rate. In one embodiment, the tubing that feeds the detonation tube is below a critical radius to prevent the detonation progressing back to the fuel-oxidant mixture supply. For example, one embodiment use ¼" diameter tubing to prevent such flashback and yet presents a low resistance to gas flow. For example, a 1" long detonator having a ¼" diameter bore hole can achieve detonation using a 1 joule spark within a MAPP gas-air mixture flowing at 50 liters/minute.

Also shown in FIG. 2A is an optional secondary fuel-oxidant mixture supply 105'. One or more secondary fuel-oxidant mixture supplies 105' can be used to speed up the filling of a large detonation tube (or tube combination). With one approach, one or more secondary fuel-oxidant mixture supplies 105' are used to speed up filling of a detonation tube 100 in parallel with the (primary) fuel-oxidant mixture supply 105 such that detonator 114 can ignite the flowing fuel-oxidant mixture at a desired flow rate. With another approach, fuel-oxidant mixture supply 105 may supply the detonation tube at a first higher rate and then change to a second rate prior to the flowing fuel-oxidant mixture being ignited. In still another approach, secondary fuel-oxidant mixture supply 105' supplies a different fuel-oxidant mixture 106' (not shown in FIG. 2A) into detonation tube 100 than the fuel-oxidant mixture 106 supplied by fuel-oxidant mixture supply 105 into detonator 114.

For certain fuels it may be necessary to heat the fuel-oxidant mixture in order to achieve detonation. Depending on the rate at which the detonation tube is fired, it may be necessary to cool the detonation tube. Under one preferred embodiment of the invention, fuel-oxidant mixture supply 105 (and/or 105') comprises at least one heat exchange apparatus (not shown) in contact with the detonation tube that serves to transfer heat from the detonation tube to the fuel-oxidant mixture. A heat exchange apparatus can take any of various well known forms such as small tubing that spirals around the detonation tube from one end to the other where the tightness of the spiral may be constant or may vary over the length of the detonation tube. Another exemplary heat exchanger approach is for the detonation tube to be encompassed by a containment vessel such that fuel-oxidant mixture within the containment vessel that is in contact with the detonation tube absorbs heat from the detonation tube. Alternatively, a heat exchanger apparatus may be used that is independent of fuel-oxidant mixture supply 105 in which case some substance other than the fuel-oxidant mixture, for example a liquid such as water or silicon, can be used to absorb heat from the detonation tube. Alternatively, another source of heat may be used to heat the fuel-oxidant mixture. Generally, various well known techniques can be used to cool the detonation tube and/or to heat the fuel-oxidant mixture including methods that transfer heat from the detonation tube to the fuel-oxidant mixture.

FIG. 2B depicts a first embodiment of the detonator of the present invention that functions by creating an electrical arc within a stream of a detonatable gas mixture. As shown in FIG. 2B, a gas mixture 106 of a combustible gas and oxidizer in the correct detonable ratio is passed into a detonation tube 100 via fill point 208 of detonator 114. When the tube is substantially full, high voltage wire 108 is triggered at high voltage pulse input 214 to cause a spark 212 to occur across bare wires 210 and to pass through the gas mixture 106 flowing into the detonation tube 100 to initiate detonation of the gas in the detonation tube 100. Triggering of high voltage pulse is controlled by timing control mechanism 216.

Figure 2C:
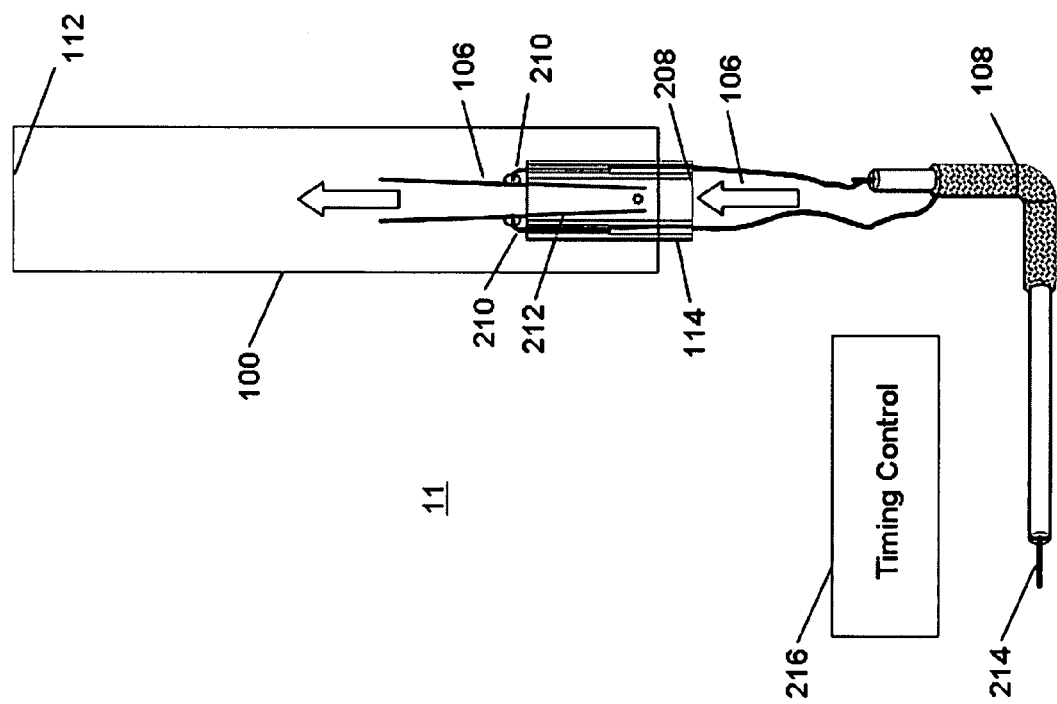
FIG. 2C depicts a second embodiment of the detonator of the present invention is similar to that depicted in FIG. 2B except it includes two conductors that diverge into the main tube causing the length of the spark to increase as it travels into the main detonation tube.

FIG. 2C depicts a second embodiment of the detonator of the present invention that also functions by creating an electrical arc within a stream of a detonatable gas mixture. As shown in FIG. 2C, a gas mixture 106 of a combustible gas and oxidizer in the correct detonable ratio is passed into a detonation tube 100 via fill point 208 of detonator 114. When the tube is substantially full, high voltage wire 108 is triggered at high voltage pulse input 214 to cause a spark 212 to occur across bare wires 210 and to pass through the gas mixture 106 flowing into the detonation tube 100 to initiate detonation of the gas in the detonation tube 100. In this variation the spark is initiated within detonator 114 and then it is quickly swept along the two diverging conductors into the detonation tube 100 by the flowing gas, the length of the spark increasing as it travels into the detonation tube 100. When a spark is initiated in a small gap it creates a stable low impedance zone that is capable of conducting the same voltage electricity across a much larger gap. Alternatively, the wires 210 may be parallel but bent slightly closer together to ensure that the spark starts inside detonator 114.

FIGS. 3A and 3B provide end and side views of an exemplary embodiment of the overpressure wave generator 11 of the present invention. As shown in FIGS. 3A and 3B, detonator 114 comprises insulating cylinder 302 surrounding detonator tube 304. Electrodes 306 are inserted from the sides of insulating cylinder 302 and are connected to high voltage wire 108. The detonator tube 304 is connected to fuel-oxidant mixture supply 105 (shown in FIG. 3B) at fill point 208 and to detonation tube 100 at its opposite open end 310. As shown in FIG. 3B, a gas mixture 106 is passed into the detonation tube 304 via fill point 208 of detonator 114 and then out its open end 310 into detonation tube 100. When detonation tube 100 is essentially full, high voltage wire 108 is triggered to cause a spark 212 to occur across electrodes 306 thereby igniting the gas mixture 106 and creating a detonation impulse at the point of ignition that propagates through the gas mixture 106 flowing into detonator tube 304 from the ignition point to the open end 310 of detonator 114 to initiate detonation of the gas in detonation tube 100. Also shown in FIG. 3B is a Shchelkin spiral 308 just inside the closed end of detonation tube 100. The Shchelkin spiral 308 is well known in the art as a deflagration-to-detonation transition (DDT) enhancement device. In one exemplary embodiment of the invention the Shchelkin spiral 308 has 10 turns, is 7" long, and is constructed using #4 copper wire that is tightly wound against the inside of the detonation tube 100 at its base (closed end).

FIG. 3C depicts an exemplary embodiment of the detonator of the invention that is the same as shown in FIGS. 3A and 3B but which also includes a check valve 312 used to control the flow of a supplied fuel-oxidant mixture where the check valve 312 is placed in front of the spark 212, also referred to herein as the ignition point.

FIG. 3D depicts an exemplary embodiment of the detonator of the invention that is the same as shown in FIG. 3C except the check valve 312 is placed after ignition point 212.

FIG. 3E depicts an exemplary check valve 312 that can be used with the exemplary embodiments of the detonator of the present invention shown in FIGS. 3C and 3D. Check valve comprises a ball 314 held against opening 316 by spring 318. When appropriate pressure is supplied to ball 314 it compresses spring 318 allowing fuel-oxidant mixture 106 through opening 316. Other types of valves can also be used in accordance with the present invention.

Overpressure Wave Magnitude Control

Generally, the length and inside diameter of a detonation tube can be selected to achieve a desired maximum generated overpressure wave magnitude at a maximum selected flow rate of a selected flowing fuel-oxidant mixture, and the flow rate can be reduced to lower the magnitude of the generated overpressure wave. If required, increasingly larger tubes can be used to amplify the detonation pulse initially produced in a smaller detonation tube. Each one or a plurality of the tubes can be made of one or a combination of materials and allows, including PVC or a variety of different compounds, metals, or even concrete to achieve a desired result. In one exemplary embodiment the detonation tube is made of titanium. In an exemplary embodiment, the detonator within which the spark is introduced has a small diameter, e.g. approximately ¼" diameter. This assembly is aligned to the base of a second larger detonation tube so that the gas contained within it is detonated. This second detonation tube may then be aligned to the base of a successively larger diameter tube to initiate detonation of the gas mixture within. In this way, very large diameter detonation tube detonations may be initiated with precise timing accuracy.

Figure 4:
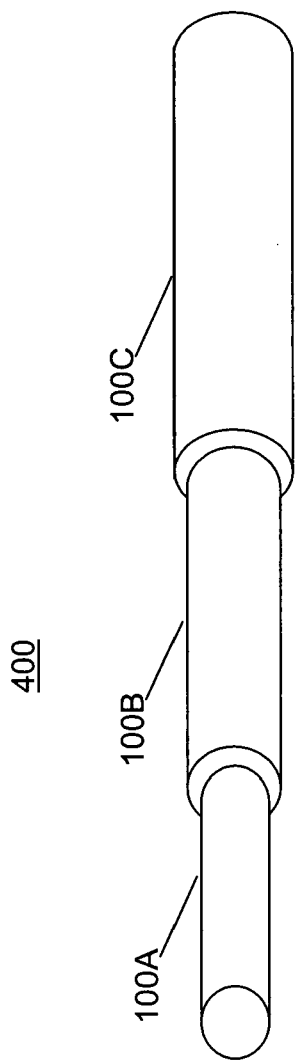
FIG. 4 depicts an exemplary graduating detonation tube combination whereby larger and larger diameter tubes are used in combination to amplify a detonation wave.

The use of tubes having increasingly larger diameters is shown in FIG. 4 which illustrates a graduating detonation tube combination 400 comprising increasingly larger detonation tubes that amplify a detonation pulse. A detonation pulse produced in an initial detonation tube 100A travels through detonation tubes 100B and 100C having larger diameters. Generally, as the detonation of the gas mixture transitions from a detonation tube having a smaller diameter to a detonation tube having a larger diameter the size of the pulse is amplified. In accordance with the invention one or more detonation tubes having different diameters can be combined into a graduating detonation tube combination 400.

Figure 5:
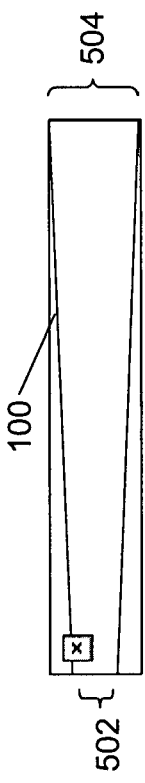
FIG. 5 depicts an exemplary detonation tube having a diameter that increases across the length of the tube that amplifies a detonation wave.
Figure 6:
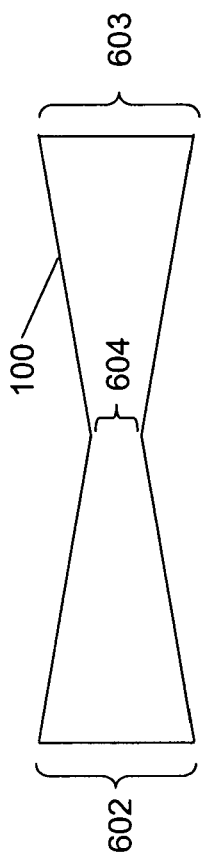
FIG. 6 illustrates a tube having a gradually shrinking and then gradually enlarging tube circumference.

In the exemplary embodiment described above, the detonation tube (and the detonator tube) was assumed to be a tube having a circumference that does not vary over the length of the tube. As an alternative, a detonation tube (or detonator tube) may begin with a small diameter and gradually grow larger in order to have a similar effect of amplifying the pulse as described for FIG. 4. One exemplary approach is shown in FIG. 5 which depicts a side view of a detonation tube 100 having a gradually enlarging diameter. The diameter of a detonation tube becoming larger and larger causes the pulse to be amplified as it travels the length of the tube in a manner similar to the graduated tube technique of FIG. 4. As shown, detonation tube 100 has a first diameter 502 at one end that is smaller than second diameter 504 at the other end. Multiple tubes having enlarging diameters can also be combined. Another variation of the detonation tube is to use a compressor/expander technique where the circumference of the tube tapers to a smaller circumference to compress the gas and then expands to a larger circumference to expand the gas. This approach is shown in FIG. 6 which depicts a side view of detonation tube 100 based on the compressor/expander technique that has a first diameter 602 at one end, a second diameter 603 at the other end and a third diameter 604 between the two ends of the detonation tube 100. The first diameter 602 may or may not equal second diameter 603 depending on desired compression/expansion characteristics.

Detonation Tube Arrays

Figure 7A:
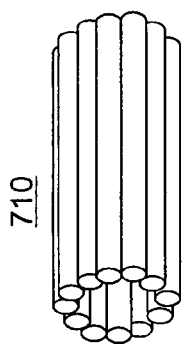
FIG. 7A depicts a first detonation tube alongside a second detonation tube.
Figure 7B:
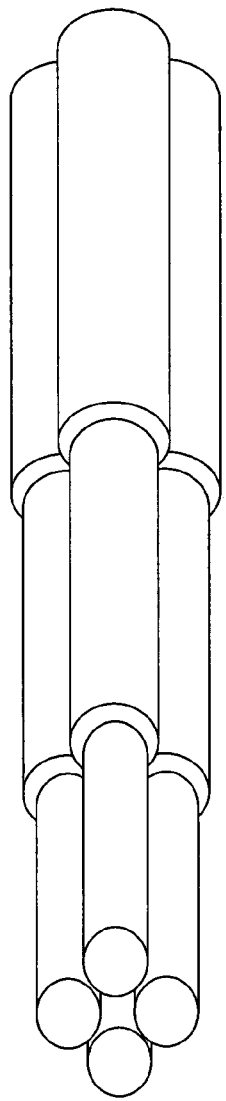
FIG. 7B depicts four detonation tube combinations arranged such that the larger detonations tubes of the detonation tube combinations are in contact with each other.
Figure 7C:
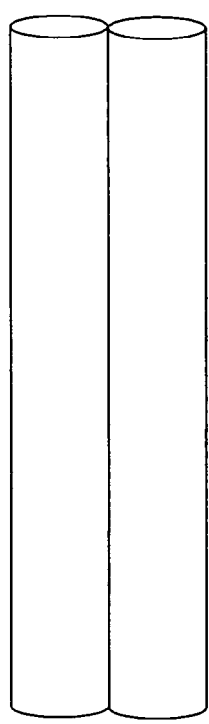
FIG. 7C depicts three enlarging diameter detonation tubes.
Figure 7E:
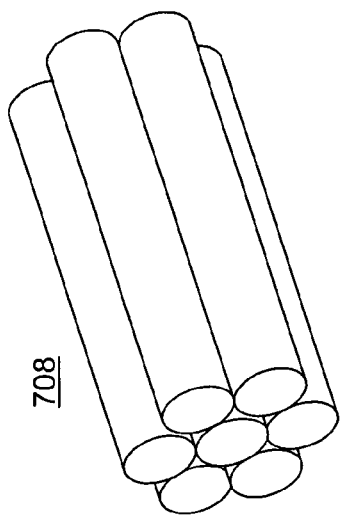
FIG. 7E depicts twelve detonation tubes arranged in a circular manner.
Figure 7D:
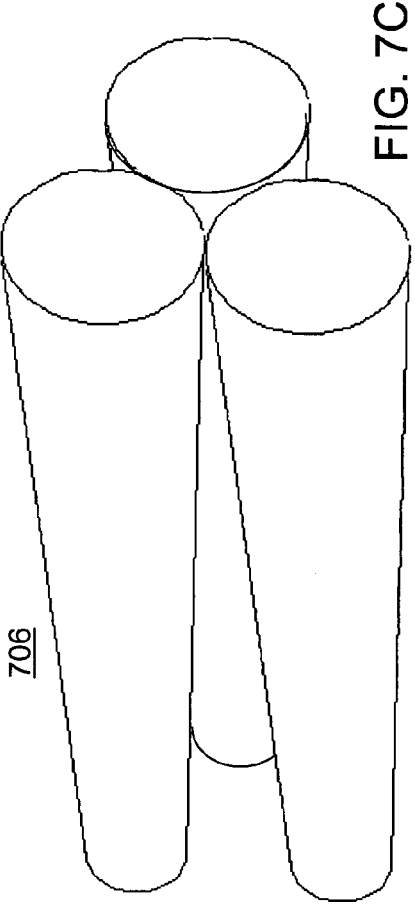
FIG. 7D depicts seven detonation tubes arranged to resemble a hexagonal structure.

Detonation tubes can be grouped into arrays in various ways to produce a combined pulse when triggered simultaneously. FIGS. 7A-7D depict examples of how detonation tubes can be combined. FIG. 7A depicts a detonation tube array 702 comprising a first detonation tube alongside a second detonation tube. FIG. 7B depicts a detonation tube array 704 comprising four detonation tube combinations arranged such that the larger detonations tubes of the detonation tube combinations are in contact with each other. FIG. 7C depicts detonation tube array 706 comprising three enlarging diameter detonation tubes. FIG. 7D depicts detonation tube array 708 comprising seven detonation tubes arranged to resemble a hexagonal structure. FIG. 7E depicts detonation tube array 710 comprising twelve detonation tubes arranged in a circular manner. Alternatively, the detonation tubes that make up such detonation tube groups or arrays can also be triggered at different times. Under one arrangement, detonation tubes are ignited using a timing sequence that causes them to detonate in succession such that a given detonation tube is being filled with its fuel-oxidant mixture while other detonation tubes are in various states of generating an overpressure wave. With this approach, the igniting and filling of the detonation tubes could be timed such that overpressure waves are being generated by the apparatus at such a high rate that it would appear to be continuous detonation.

Figure 8:
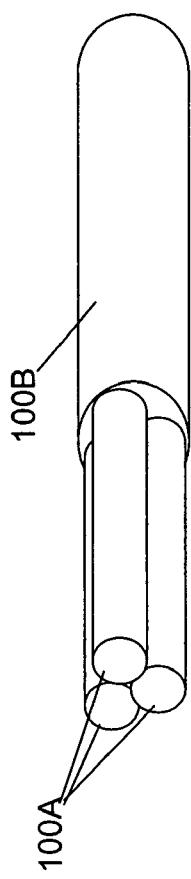
FIG. 8 depicts a side view of three detonation tubes having a first diameter connected to a larger detonation tube having a second larger diameter to amplify the combined pulse generated by the smaller tubes.

As shown in FIG. 8, a group of smaller tubes can be connected to a larger tube such that their combined pulses produce a large pulse that continues to detonate in the larger tube. FIG. 8 depicts a side view of 3 smaller detonation tubes 100A having a first diameter connected to a larger detonation tube 100B having a second larger diameter to amplify a combined pulse.

Generally, any of various possible combinations of graduated tubes, tubes of gradually increasing circumferences, tube arrays, groups of smaller tubes connected to larger tubes, and tubes employing the compressor/expander technique can be used in accordance with this aspect of the invention to generate overpressure waves that meet specific application requirements. All such combinations require balancing the energy potential created due to an expansion of a pipe circumference with the cooling caused by expansion of the gases as the tube circumference increases.

Coherent Focusing and Steering of Overpressure Waves

As described previously, the detonator of this aspect of the present invention has low uncertainty of time between the electric arc trigger and the subsequent emission of the sound pulse from the tube. The detonator also provides for repeatable precision control of the magnitude of the generated sound pulses. This low uncertainty, or jitter, and precision magnitude control enables the coherent focusing and steering of the overpressure waves generated by an array of detonation tubes. As such, the detonator can be used to generate steerable, focusable, high peak pulse power overpressure waves.

Figure 9:
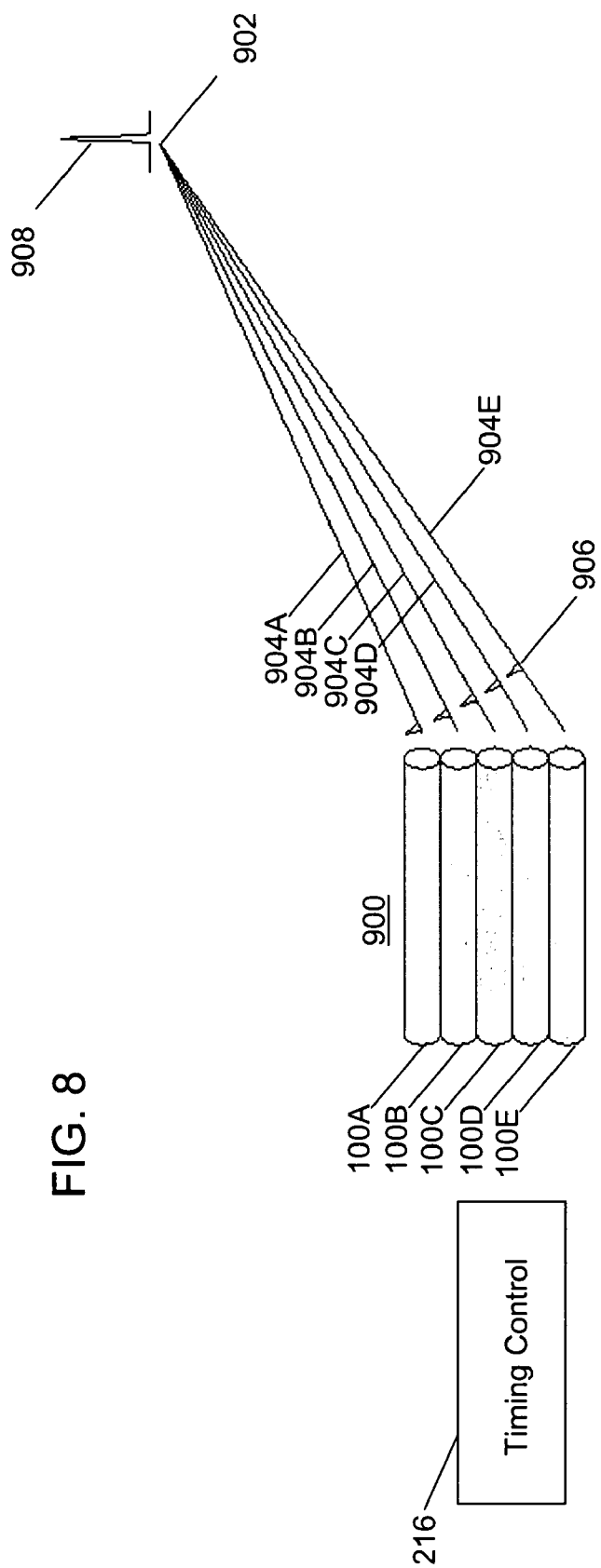
FIG. 9 provides an illustration of how the timing of the firing of individual detonation tubes focuses the power at a single point in the far field.

FIG. 9 illustrates how the timing of the firing of individual tubes focuses the power of the generated overpressure waves at a single point in the far field. Tubes further away are triggered earlier to compensate for the greater amount of time required to travel a greater distance which causes all the pulses to arrive at the same point in space at the same time. FIG. 9 depicts an array 900 of detonation tubes 100A-100E that are ignited (or fired) with controlled timing as controlled by timing control mechanism 216 such that the sound pulses they generate arrive at point in space 902 at the same time. The sound pulses 906 produced by detonation tubes 100A-100E travel along direct paths 904A-904E, respectively. As such, they are fired in sequence 100E-100A with appropriate delays between firings to account for different times of travel required to travel the different direct paths so that the sound pulses 906 arrive at point in space 902 at the same time to produce combined sound pulse 908.

Individual detonation tubes or groups of tubes can be arranged in a sparse array. FIG. 10 depicts an array of individual detonation tubes arranged in a sparse array where the timing of the detonations in the various tubes is controlled so as to steer the overpressure waves such that they combine at a desired location. FIG. 11 similarly depicts an array of groups of tubes arranged in a sparse array where the tubes of a given group are detonated at the same time but the detonation timing of the various groups is varied so as to steer the overpressure waves so they combine at a desired location.

Referring to FIG. 10, detonation tubes 100A-100D are fired in reverse sequence with precise timing as controlled by timing control mechanism 216 such that sound pulses travel direct paths 904A-904D and combine at point in space 902. Referring to FIG. 11, detonation tube groups 1100A-1100D are fired in reverse sequence as controlled by timing control mechanism 216 such that sound pulses travel direct paths 904A-904D and combine at point in space 902.

The timing control mechanism 216 used in sparse array embodiments may comprise a single timing control mechanism in communication with each of the overpressure wave generators making up the array via a wired or wireless network. Alternatively, each of the overpressure wave generators may have its own timing control mechanism whereby the timing control mechanisms have been synchronized by some means.

Theory of Operation of Detonation Tube Arrays

Generally, when an array of detonation tubes is triggered with precise timing a pressure wave is created that propagates as a narrow beam in a direction mandated by the timing. In this way its operation is analogous to a phased array antenna commonly used in radar systems. Since the timing is determined electrically the beam direction can be redirected from one pulse to the next. Systems can be designed that operate at different rates, for example 10, 20, 50 or 100 pulses per second, and each pulse can be aimed in a unique direction.

The only limitation to repetition rate is the speed with which the tubes can be refilled. At a sonic refill rate it would take about five milliseconds to refill a tube five feet long. Since it also takes a pulse five milliseconds to exit once detonated, the limiting repetition rate is 100 Hz.

Since each element of the array emits its own coherent energy, in the far field the amplitude of the wave approaches the square of the intensity of each individual tube. The instantaneous over pressures that can be directed in this way therefore may approach high levels. As such, the system possesses a large overhead dynamic range that can be used to reach a long range or propagate through small apertures in structures such as hard targets.

The structure behind the small aperture can be resonated by application of the pulses at just the right time intervals, as determined by a probe laser used to measure the Doppler shift of particles at the opening. The natural frequency of the structure can thereby be determined and thereafter the laser is used in closed loop mode to control the timing of the system to produce maximum effect. The instantaneous pressures inside such a hard target can be quite large since the acoustic Q is high. For example, for a Q of only 10 the peak pressure could approach 1000 psi.

Figure 12:
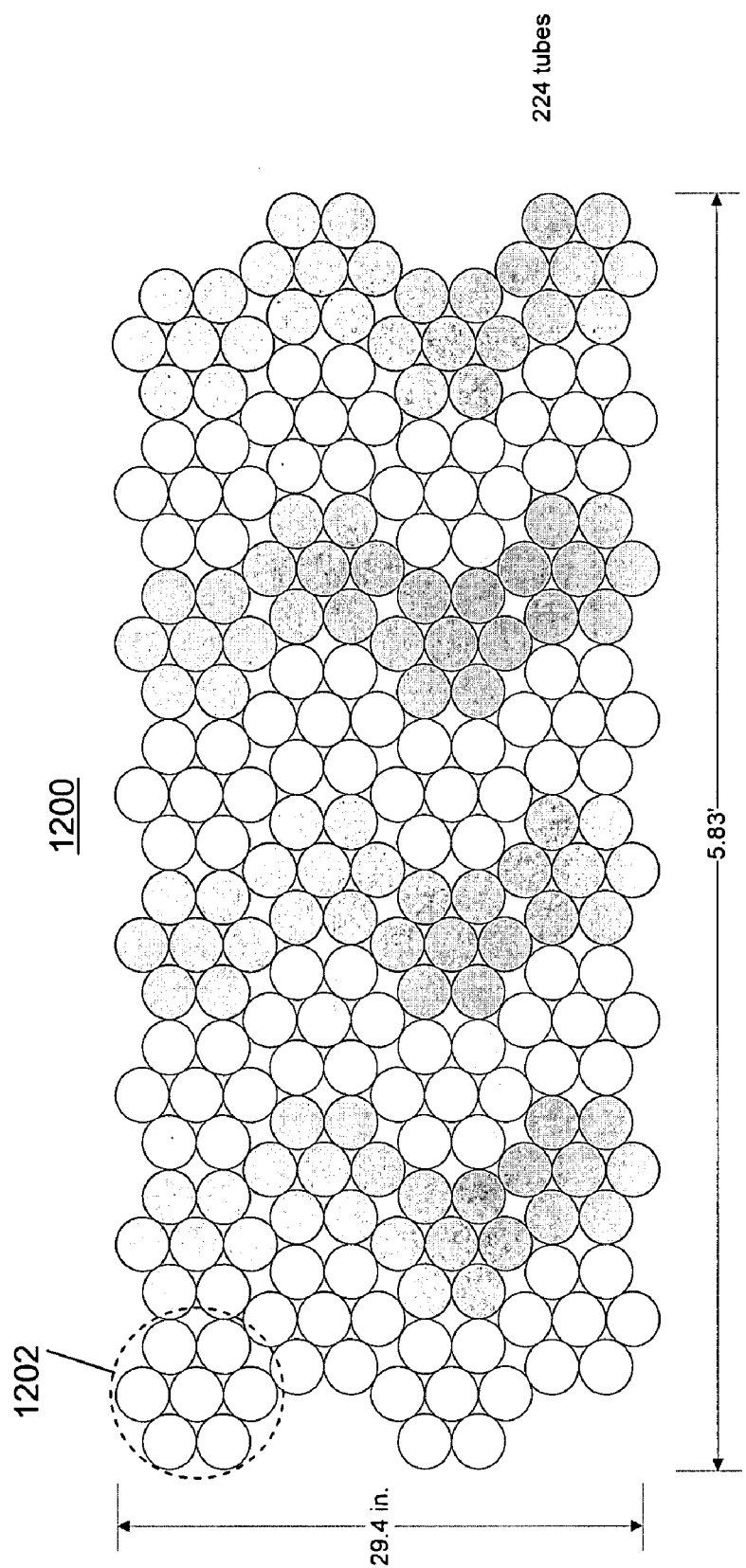
FIG. 12 illustrates an example of efficient packing of hexagonal sub-arrays of 7 detonation tubes into a combined array totaling 224 detonation tubes.

Groups of detonation tubes can be treated as sub-arrays within a larger array. FIG. 12 illustrates an exemplary embodiment of 32 hexagonal sub-arrays 1202 of 7 detonation tubes each efficiently packed into an array 1200 having a total of 224 3" diameter detonation tubes in a 6.2'×2.5' format. The far field intensity of this system can be over 50,000 times the intensity of one such 3" detonation tube.

Timing of the firing of the array elements of this embodiment is straightforward. The waveform is about one millisecond long and the constraint for coherence is ¼ of its wavelength or less. The timing subsystem therefore will need a resolution and accuracy of 200 microseconds or less. This level of timing accuracy can be accomplished with programmable counter-timers such as Intel's 8254 PCA that provides three channels of timing per chip, at a resolution of 0.1 microsecond.

In one embodiment, each element in a steerable array needs to have its energy spread over the entire area of steerability, for example, with an aperture that has under ½ wavelength. For a one millisecond waveform the aperture is about six inches. In the exemplary embodiment shown in FIG. 12, the hexagonal sub-array bundles are nine inches across so they will not allow steering over a full half hemisphere but grouping the tubes into the hexagonal bundles that are fired as a group reduces the hardware requirements allowing thirty two programmable timing channels are used to focus and steer the array. As such, all timing needs can be met with only eleven 8254's. A PCI board made by SuperLogics contains four 8254's giving twelve programmable counter-timers so three modules would suffice. In another embodiment, the tubes of each buddle in FIG. 12 could be spaced apart sufficiently to enable steering over a full half hemisphere and the firing of all the tubes could be independent, without grouping.

The focal spot of the array is a function of the wavelength and the size of the array. Near the array face the focal spot comprises an approximate circle one wavelength, i.e. one foot in diameter. At greater distances the spot will gradually spread out in an oval shape with its large diameter in the direction of the small diameter of the array. That is, the oval becomes vertical for the horizontal array depicted in FIG. 12. The shape of the focal spot can be easily modeled using the wave equation when it is operated in the linear regime up to about half an atmosphere or 7 psi. However when the instantaneous pressure in the waveform approaches an atmosphere it will be non-linear and the calculation differs.

Measurements of the pressure output of the array can be made with a wide band acoustic sensor. They typically have a bandwidth of 10-20,000 Hz and an accuracy of 1 dB or so. Measurements made at a distance of thirty feet or more in the far field of the array give accuracies sufficient to extrapolate characteristics at any range. The calibrated output of such an instrument is acoustic sound pressure level which has a direct relationship to pressure, i.e.

$$L_p(dBSPL) = 10 \cdot \log_{10} \frac{p}{p_0}.$$

For example, 180 dBSPL is equivalent to a pressure of 20,000 Pa or about 3 psi. The instantaneous sound intensity associated with this level is 1,000,000 W/m².

A consequence of the general wave equation for linear media is that when waves superimpose their amplitudes add. For electromagnetic waves this means that if two identical waves arrive at a point in space at the same time and phase they will produce double the potential, or voltage of a single wave.

The result is similar in the case of acoustic waves but in this case the potential is pressure rather than voltage.

$$p = \sqrt{p_1^2 + p_2^2 + 2p_1 p_2 \cos(\theta_1 - \theta_2)} N/m^2$$

Note that since the phases are equal the cosine is equal to 1 and the value of the pressure is equal to twice the pressure of a single source. This relation applies for the addition of N sources=N*p.

Doubling the pressure of an acoustic waveform quadruples its power since power is proportional to the square of its pressure, namely, when two identical acoustic waveforms arrive at the same point in space at the same time and phase their power will quadruple.

In analogy to electromagnetic waves the power, or acoustic intensity, of a waveform is proportional to the square of its pressure.

$$I = \frac{p^2}{\rho c} \text{Watts}/m^2$$

Where the denominator is the value of the acoustic impedance of the medium, in this case air.

Therefore, generally the free-space, far-field power in the main lobe of the overpressure waveform can be calculated as $N^2$ of the pressure of a single detonation tube. However, when it is operated near the ground, advantage can also be taken of the additive effect of the ground wave. When the wave from the ground and the free-space waveforms converge on a target the pressures of both waveforms again add and quadruple the power again.

Beam steering is accomplished by adjusting the timing of the individual elements such that the closer ones are delayed just enough for the waves from the further part of the array to catch up. In a given steering direction therefore all of the waves will arrive at the same time and satisfy the $N^2$ power criterion. This is analogous to a phased array antenna but since the acoustic waveform is transient rather than continuous wave, time delay is substituted for phase.

Additional Applications of the Detonator of the Present Invention

In addition to supplying a detonation impulse to detonation tubes having an open end, as described above, additional applications of the detonator of the present invention include but are not limited to supplying a detonation impulse to internal combustion engines (or combustion chambers) and to pulse detonation engines.

The detonator of the present invention can be used to replace the spark plugs currently used to ignite fuel-oxidant mixtures in internal combustion engines used in cars, trucks, planes, ships, motorcycles, fork lifts, portable generators, lawnmowers, chain saws, and countless other mechanisms. FIGS. 13A-13L depict the intake, compression, combustion and exhaust strokes that occur during two crankshaft rotations per working cycle of a conventional four-stroke (Otto-cycle) engine.

Figure 13A:
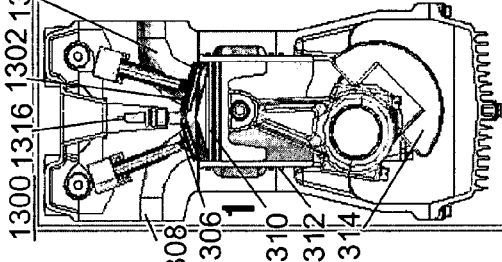
FIGS. 13A-13L depict the intake, compression, combustion and exhaust strokes that occur during two crankshaft rotations per working cycle of a conventional four-stroke (Otto-cycle) engine.
Figure 13B:
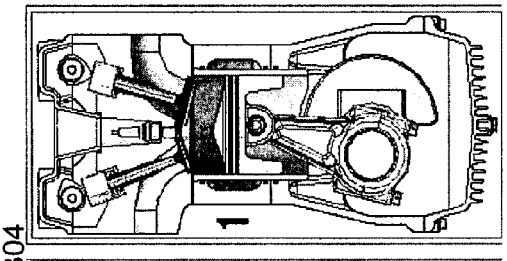
Figure 13C:
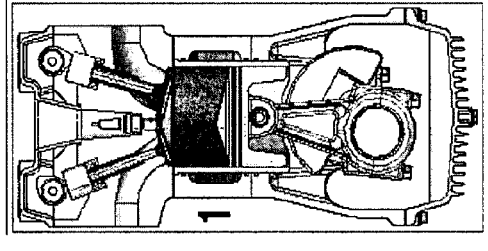
Figure 13D:
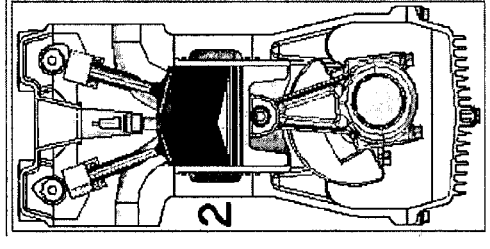
Figure 13E:
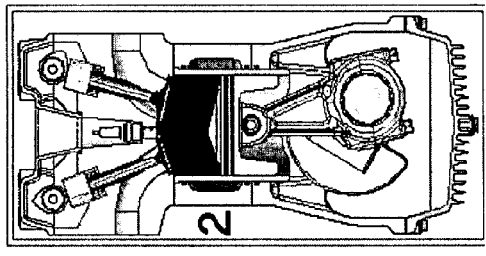
Figure 13F:
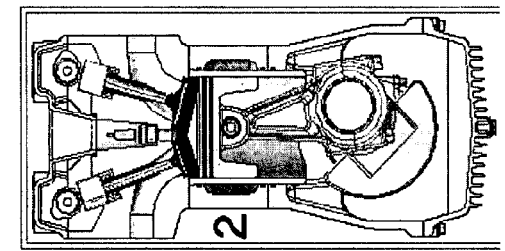
Figure 13G:
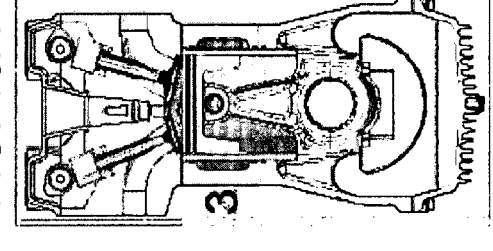
Figure 13H:
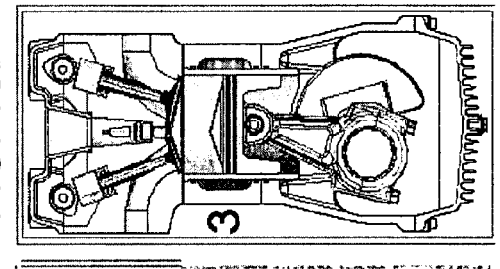
Figure 13I:
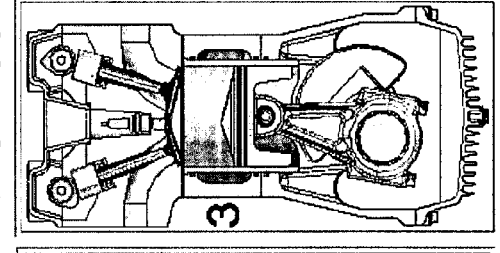
Figure 13J:
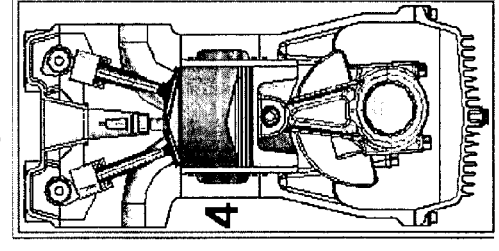
Figure 13K:
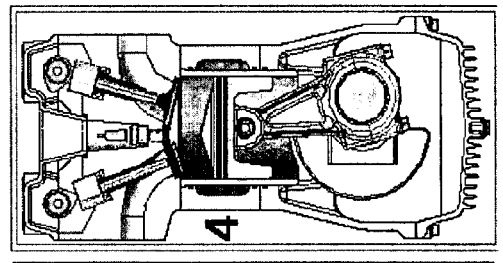
Figure 13L:
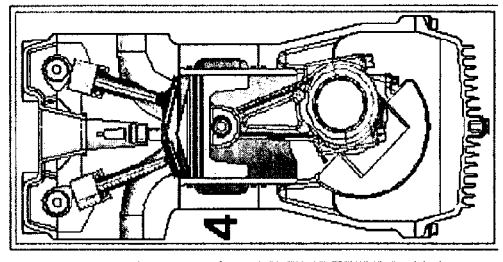

Referring to FIGS. 13A-13L, an exemplary Otto-cycle internal combustion engine 1300 includes intake valve 1302, fuel-oxidant mixture inlet 1304, exhaust valve 1306, exhaust outlet 1308, piston 1310, cylinder 1312, crank 1314, and spark plug 1316. FIGS. 13A-13L depict the Otto-cycle engine 1300 at various times as it progresses through its four cycles, intake 1, compression 2, power 3, and exhaust 4. FIGS. 13A-13C depict the engine 1300 being supplied by fuel-oxidant mixture inlet 1304 via open intake valve 1302. FIGS. 13D-13F show the piston 1310 of engine 1300 compress the fuel-oxidant mixture inside cylinder 1312. FIG. 13G depicts the spark plug igniting the fuel-oxidant mixture inside cylinder 1312 which forces piston 1310 downward as shown in FIGS. 13H and 13I. FIGS. 13J through 13L depict the engine 1300 clearing the exhaust from cylinder 1310 out exhaust outlet 1308 via open exhaust valve 1306. The 4-cycle process then repeats.

Figure 14:
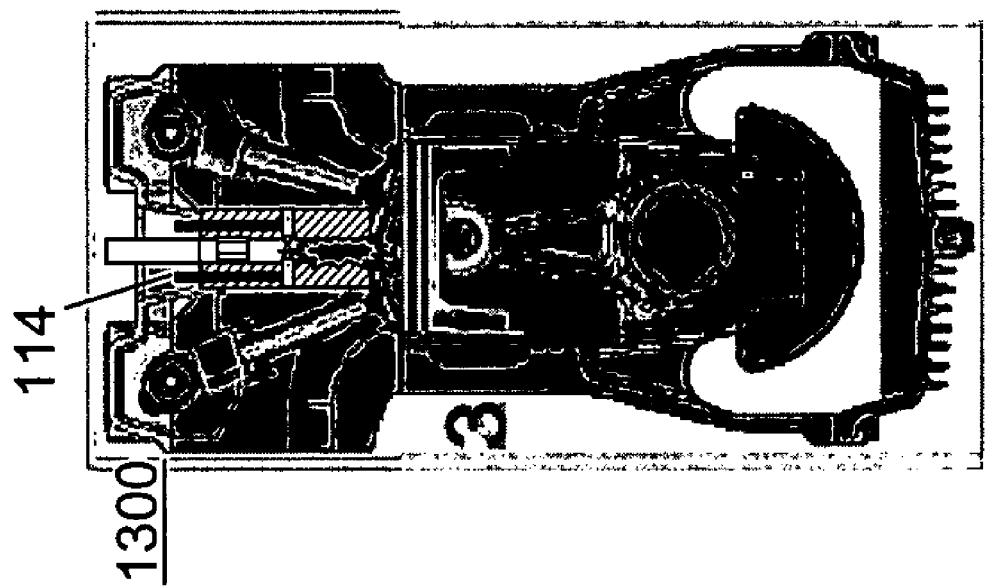
FIG. 14 depicts the start of the combustion stroke of the four-stroke (Otto-cycle) engine of FIGS. 13A-13L using the detonator of the present invention to ignite the fuel-oxidant mixture.

FIG. 14 depicts the same engine 1300 shown in FIGS. 13A-13L except spark plug 316 is replaced by detonator 114. FIG. 14 corresponds to FIG. 13G. In FIG. 14, detonator 114 is shown providing a detonation impulse to the combustion engine 1300 to ignite the fuel-oxidant mixture which starts its combustion stroke 3.

FIG. 15 depicts an exemplary Wankel engine 1500 using two detonators 114 of the present invention. The present invention can similarly be used in other types of internal combustion engines including, but not limited to, two-stroke, five-stroke, Beare Head, Bourke, and gas turbine engines.

The detonator of the present invention can be used to supply a detonation impulse to pulse detonation engines used in various types of applications such as airplane and rocket engines. FIG. 16 depicts a cross-section of an aircraft wing having four pulse detonation engines using the detonator of the present invention. As shown, four pulse detonation engines each include a detonation tube 100 and detonator 114 receiving fuel-oxidant mixture 106 via fuel-oxidant mixture supply 105. The detonation tubes 100 can be fired at different times or at the same time.

FIG. 17 depicts an exemplary turbine 1700 of a pulse detonation turbine engine based upon multiple pulse detonation engines using the detonator of the present invention. As shown, twelve pulse detonation engines each comprising a detonation tube 100 and a detonator 114 are arranged to fire in such a manner as to cause turbine 1700 to turn counter-clockwise. The detonation tubes 100 can be fired at different times or at the same time.

FIG. 18 depicts an exemplary arrangement of pulse detonation engines using the detonator of the present invention that might be used to provide thrust for a rocket engine 1800. As shown, detonation tubes 100 are arranged in a circular manner inside a larger detonation tube 100b. Each of the smaller detonation tubes 100A has a corresponding detonator 114. The detonation tubes 100A can be fired at different times or at the same time.

The applications of the detonator, ignition system, and ignition method described herein were provided as an example of the types of applications that are enabled by the present invention. While particular embodiments and several exemplary applications (or implementations) of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

What is claimed is:

1. A detonator, comprising:
a detonator tube having a first end and a second end, said first end being a fill point and said second end being an open end, said detonator having an ignition point positioned at a substantially central point of a cross section of said detonator tube between said first end and said second end, said detonator tube being supplied a gaseous or dispersive fuel-oxidant mixture at said fill point of said detonator tube, said fuel-oxidant mixture comprising a fuel and an oxidant, a predetermined mass ratio of said fuel versus said oxidant and a predetermined flow rate of said fuel-oxidant mixture being maintained to achieve detonation characteristics, said detonation characteristics depending on length and diameter characteristics of said detonator tube, said gaseous or dispersive fuel-oxidant mixture flowing through said ignition point from said fill point of said detonator tube; and
an igniter, said igniter being placed at said ignition point within said detonator tube, said igniter igniting said gaseous or dispersive fuel-oxidant mixture at said ignition point while said gaseous or dispersive fuel-oxidant mixture is flowing at said predetermined flow rate through said ignition point within said detonator tube thereby producing a detonation impulse substantially at said ignition point that propagates to said open end of said detonator tube.

2. The detonator of claim 1, further comprising:
a valve, said valve located inside said detonator tube.

3. The detonator of claim 2, wherein said valve is a check valve.

4. A system for igniting a gaseous or dispersive fuel-oxidant mixture, comprising:
a detonator tube having a fill point at a first end of said detonator tube, an open end at a second end of said detonator tube, an ignition point at a substantially central point within a cross section of said detonator tube between said first end of said detonator tube and said second end of said detonator tube, and an igniter at said ignition point within the detonator tube; and
a fuel supply for supplying a gaseous or dispersive fuel-oxidant mixture to said fill point of said detonator tube such that said fuel-oxidant mixture flows through said ignition point within said detonator tube, said fuel-oxidant mixture comprising a fuel and an oxidant, a predetermined mass ratio of said fuel versus said oxidant and a predetermined flow rate of said fuel-oxidant mixture being maintained to achieve detonation characteristics, said detonation characteristics depending on length and diameter characteristics of said detonator tube, said igniter igniting said gaseous or dispersive fuel-oxidant mixture at said ignition point while said gaseous or dispersive fuel-oxidant mixture is flowing at said predetermined flow rate through said ignition point within said detonator tube thereby producing a detonation impulse at said ignition point that propagates to said open end of said detonator tube.

5. The system of claim 4, further comprising:
a valve, said valve located inside said detonator tube.

6. The system of claim 5, wherein said valve is a check valve.

7. The system of claim 6, wherein said valve is located before said ignition point.

8. The system of claim 4, wherein said detonation impulse is supplied to one of a detonation tube having an open end, a combustion chamber, an internal combustion engine, or a pulse detonation engine.

9. The system of claim 5, wherein a mass ratio of fuel versus oxidant and a flow rate of said gaseous or dispersed fuel-oxidant mixture is selected based on a length and a diameter of said detonator tube.

10. The system of claim 4, wherein said gaseous or dispersive fuel-oxidant mixture comprises at least one of ethane, methane, propane, hydrogen, butane, alcohol, acetylene, MAPP gas, gasoline, aviation fuel, a petroleum distillate, naphtha, mineral oil, kerosene, diesel, benzene or DEET.

11. The system of claim 4, further comprising:
a timing control mechanism for controlling the timing of the igniter.

12. A system for igniting a gaseous or dispersive fuel-oxidant mixture, comprising:
a detonator, comprising:
a detonator tube, said detonator tube having a fill point at a first end and an open end at a second end; and
an igniter, said igniter being placed at an ignition point at a substantially central point within a cross section of said detonator tube between said first end and said second end; and
a fuel-oxidant mixture supply that supplies a gaseous or dispersive fuel-oxidant mixture to said fill point of said detonator tube, said fuel-oxidant mixture comprising a fuel and an oxidant, a predetermined mass ratio of said fuel versus said oxidant and a predetermined flow rate of said fuel-oxidant mixture being maintained to achieve detonation characteristics, said detonation characteristics depending on length and diameter characteristics of said detonator tube, said gaseous or dispersive fuel-oxidant mixture flowing through said ignition point of said detonator tube, said igniter igniting said gaseous or dispersive fuel-oxidant mixture at said ignition point while said gaseous or dispersive fuel-oxidant mixture is flowing at said predetermined flow rate through said ignition point within said detonator tube thereby producing a detonation impulse at said ignition point that propagates to said open end of said detonator tube.

13. The system of claim 12, said detonator further comprising:
a valve, said valve located inside said detonation tube.

14. The system of claim 13, wherein said valve is a check valve.

15. The system of claim 13, wherein said valve is located before said ignition point.

16. The system of claim 12, wherein a mass ratio of fuel versus oxidant and a flow rate of said gaseous or dispersed fuel-oxidant mixture is selected based on a length and a diameter of said detonator tube.

17. The system of claim 12, wherein said gaseous or dispersive fuel-oxidant mixture comprises at least one of ethane, methane, propane, hydrogen, butane, alcohol, acetylene, MAPP gas, gasoline, aviation fuel, a petroleum distillate, naphtha, mineral oil, kerosene, diesel, benzene or DEET.

18. The system of claim 12, further comprising:
a timing control mechanism that controls the timing of the igniter.

19. The system of claim 18, wherein said timing control mechanism comprises one of a trigger mechanism, fixed logic, or a control processor.

20. The system of claim 12, wherein said igniter comprises one of a high voltage pulse source, a triggered spark gap source, a laser, or an exploding wire.

* * * * *